(12) United States Patent
Horikiri et al.

(10) Patent No.: US 9,298,335 B2
(45) Date of Patent: Mar. 29, 2016

(54) INFORMATION PROCESSING DEVICE, INFORMATION PROCESSING METHOD, AND COMPUTER-READABLE MEDIUM

(71) Applicant: FUJI XEROX CO., LTD., Minato-ku, Tokyo (JP)

(72) Inventors: Kazunori Horikiri, Kanagawa (JP); Nobuyuki Yamazoe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 257 days.

(21) Appl. No.: 14/155,950

(22) Filed: Jan. 15, 2014

(65) Prior Publication Data

US 2014/0337468 A1 Nov. 13, 2014

(30) Foreign Application Priority Data

May 10, 2013 (JP) .................... 2013-100194

(51) Int. Cl.
*G06F 15/16* (2006.01)
*G06F 15/173* (2006.01)
*G06F 3/048* (2013.01)
*G06F 3/0488* (2013.01)
*G06F 3/14* (2006.01)
*G06F 3/0481* (2013.01)

(52) U.S. Cl.
CPC .............. *G06F 3/048* (2013.01); *G06F 3/0481* (2013.01); *G06F 3/0488* (2013.01); *G06F 3/1454* (2013.01); *H04N 2201/0438* (2013.01)

(58) Field of Classification Search
CPC ....... G06F 3/0488; G06F 17/24; G01C 21/00; G01C 21/20; G01C 21/32
See application file for complete search history.

(56) References Cited

U.S. PATENT DOCUMENTS

| 7,263,494 B1* | 8/2007 | Harris | G06Q 10/02 235/384 |
| 7,757,165 B1* | 7/2010 | Stuple | G06F 9/543 715/236 |
| 7,770,127 B2* | 8/2010 | Nittynen | G06F 3/0481 715/764 |
| 2007/0022389 A1* | 1/2007 | Ording | G06F 3/0481 715/790 |
| 2012/0084694 A1* | 4/2012 | Sirpal | G06F 1/1616 715/769 |
| 2012/0242688 A1* | 9/2012 | Boyle | G06T 11/206 345/629 |

FOREIGN PATENT DOCUMENTS

JP 2011-90486 A 5/2011

* cited by examiner

*Primary Examiner* — Peling Shaw
(74) *Attorney, Agent, or Firm* — Sughrue Mion, PLLC

(57) ABSTRACT

An information processing device includes a first receiving unit that receives information specifying an area for pasting sticky information onto a board, the information being at least start point information indicating a start point for pasting sticky information within that area, and direction information indicating a direction in which to paste sticky information in order from that start point, an associating unit that associates sticky information pasted onto the board, on the basis of start point information and direction information received by the first receiving unit, and a display that displays a sticky information group associated by the associating unit so as to indicate the association on the board.

10 Claims, 12 Drawing Sheets

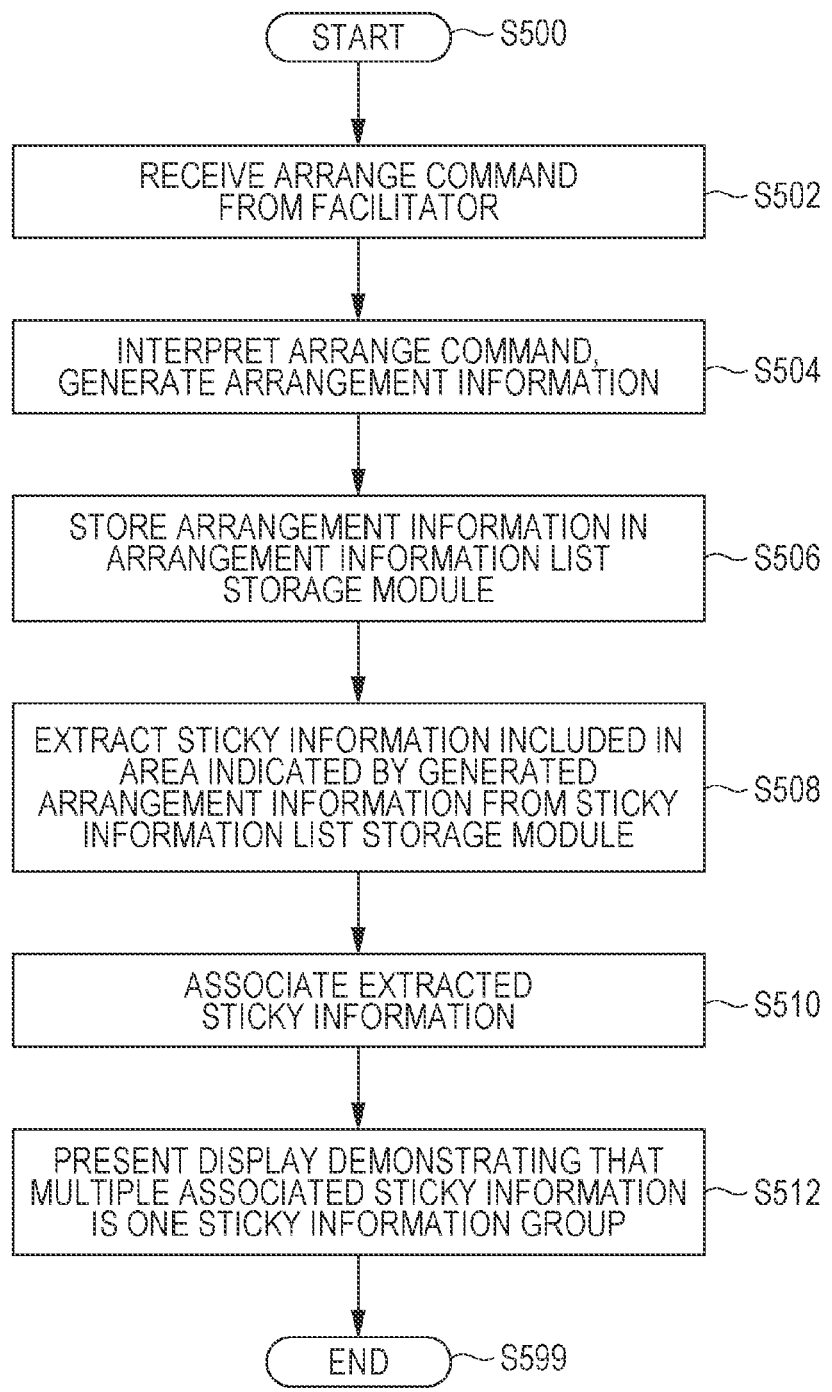

FIG. 7

| 710 | 720 | 730 | 740 | 750 | 780 | 790 |
|---|---|---|---|---|---|---|
| ARRANGEMENT INFORMATION ID | START COORDINATES | DIRECTION | WRAPPING POINT COORDINATES | DIRECTION | ... | PATTERN | GROUP ID |

| 810 | 820 | 830 | 840 | 850 | 860 | 870 | 880 | 890 |
|---|---|---|---|---|---|---|---|---|
| STICKY ID | STICKY CONTENT | CREATOR ID | CREATION TIME | CREATION DEVICE ID | TRANSMISSION TIME | SPECIFIED STICKY ID | COMMENT | COORDINATES |
| | | | | | | | | |

| 905 | 910 | 915 | 920 | 925 | 930 | 935 | 940 | 945 |
|---|---|---|---|---|---|---|---|---|
| BOARD ID | BOARD BACKGROUND | PARTICIPANT ID | FACILITATOR ID | CREATION TIME | END TIME | NUMBER OF GROUPS | GROUP ID | GROUP NAME |
| | | | | | | | | |

| 950 | 955 | 960 | 965 | 970 | 975 |
|---|---|---|---|---|---|
| GROUP POSITION | STICKY ID IN GROUP | NUMBER OF STICKIES | STICKY ID | STICKY POSITION | NUMBER OF LIKES |
| | | | | | |

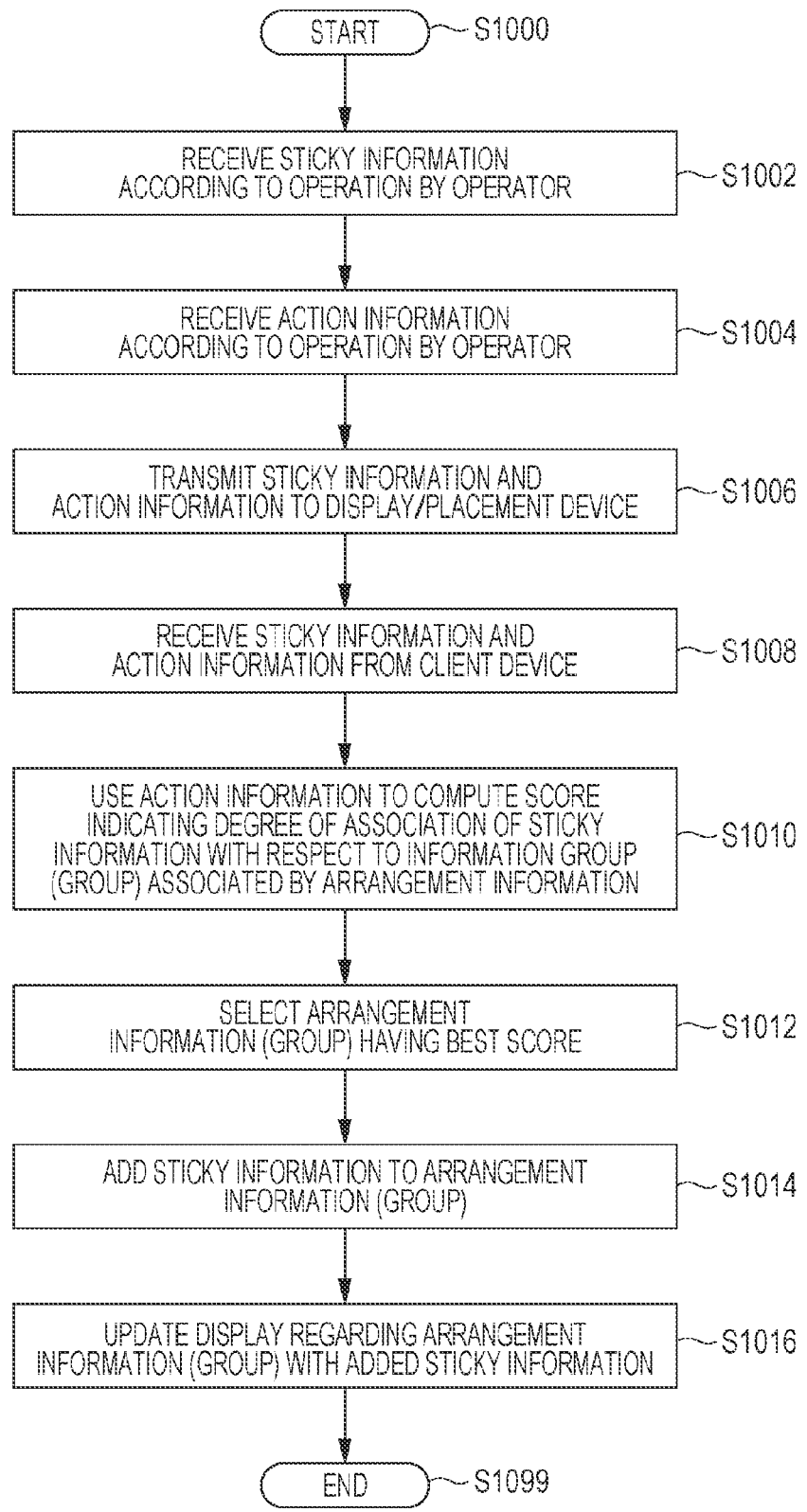

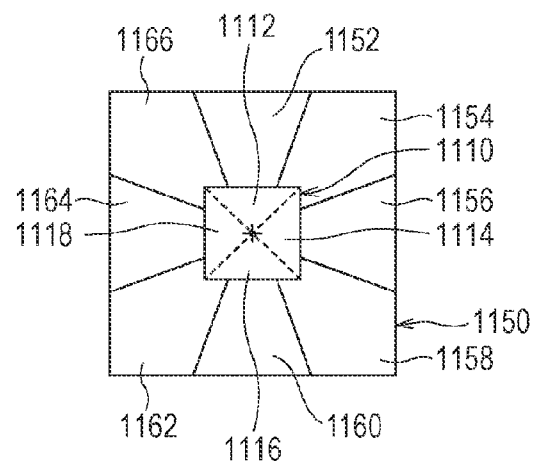

INFORMATION PROCESSING DEVICE, INFORMATION PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2013-100194 filed May 10, 2013.

BACKGROUND

Technical Field

The present invention relates to an information processing device, an information processing method, and a computer-readable medium.

SUMMARY

According to an aspect of the invention, there is provided an information processing device that includes a first receiving unit that receives information specifying an area for pasting sticky information onto a board, the information being at least start point information indicating a start point for pasting sticky information within that area, and direction information indicating a direction in which to paste sticky information in order from that start point, an associating unit that associates sticky information pasted onto the board, on the basis of start point information and direction information received by the first receiving unit, and a display that displays a sticky information group associated by the associating unit so as to indicate the association on the board.

BRIEF DESCRIPTION OF THE DRAWINGS

An exemplary embodiment of the present invention will be described in detail based on the following figures, wherein:

FIG. 5 is a flowchart illustrating an exemplary process according to the exemplary embodiment;

FIG. 7 is an explanatory diagram illustrating an exemplary data structure of an arrangement information list;

FIG. 8 is an explanatory diagram illustrating an exemplary data structure of a sticky information table;

FIG. 9 is an explanatory diagram illustrating an exemplary data structure of a board information table;

FIG. 10 is a flowchart illustrating an exemplary process according to the exemplary embodiment;

FIG. 11 is an explanatory diagram illustrating an example of action information according to the exemplary embodiment;

FIG. 12 is an explanatory diagram illustrating an exemplary data structure of an action information table.

DETAILED DESCRIPTION

Hereinafter, an exemplary embodiment related to realizing the present invention will be described by way of example on the basis of the drawings.

Figure 1:
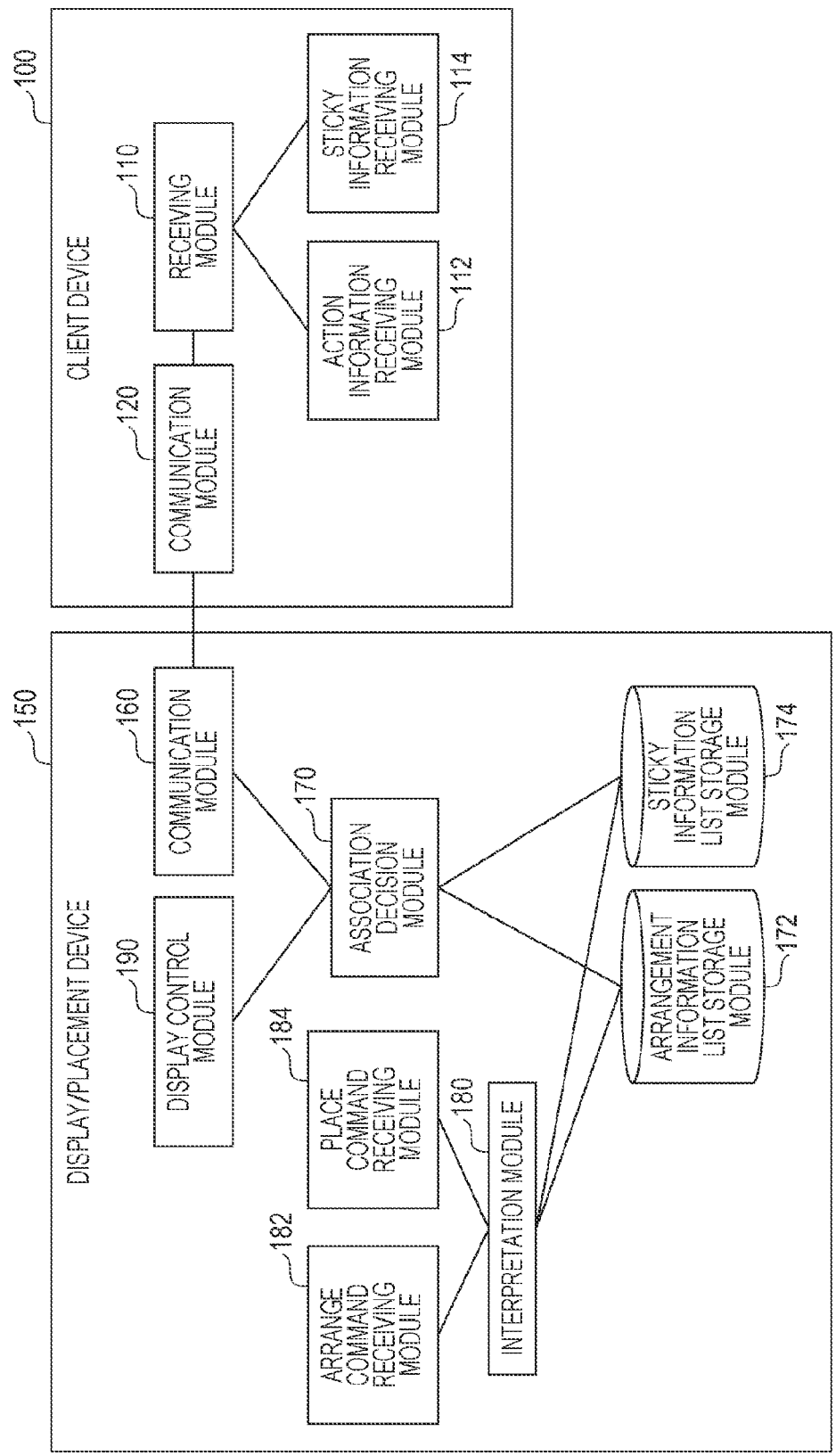
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage apparatus is made to store information or that control is applied to cause a storage apparatus to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predefined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predefined values", the predefined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "apparatus" not only encompass configurations in which multiple computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time multiple processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be reduced or omitted in some cases. Note that the storage apparatus herein may include hard disks, random access memory (RAM), an auxiliary or external storage medium, storage apparatus accessed via a communication link, and registers, etc. inside a central processing unit (CPU).

A display/placement device 150, which is an information processing device according to the exemplary embodiment, pastes and displays sticky information (also called electronic sticky notes or electronic cards) transmitted from a client device 100 on a board, and as illustrated by example in FIG. 1, includes a communication module 160, an association decision module 170, an arrangement information list storage module 172, a sticky information list storage module 174, an interpretation module 180, an arrange command receiving module 182, a place command receiving module 184, and a display control module 190. Also, a client device 100 connected to the display/placement device 150 via a communication link includes a receiving module 110, an action information receiving module 112, a sticky information receiving module 114, and a communication module 120. The communication link may be wired or wireless.

The display/placement device 150 is utilized during a meeting (such as a conference, brainstorming session, or review session) conducted by a facilitator (generally one person) and multiple participants using sticky information. A participant uses a client device (such as the client device 100) as a participant device to create sticky information stating an idea or the like. Typically, as illustrated by example in FIG. 2, there are multiple client devices 100, such as a client device 100a, a client device 100b, and a client device 100c (hereinafter collectively called the client device 100). In addition, the display/placement device 150 receives sticky information from a client device 100, and pastes that sticky information onto a board. The facilitator uses a shared screen, which is the display output of the display/placement device 150, and proceeds with the meeting by, for example, determining or modifying the position of sticky information, collecting sticky information together, or creating sticky information him- or herself on the board.

The receiving module 110 is connected to the action information receiving module 112, the sticky information receiving module 114, and the communication module 120. The receiving module 110 passes information receiving by the action information receiving module 112 or the sticky information receiving module 114 to the display/placement device 150 via the communication module 120 and a communication link.

The action information receiving module 112 is connected to the receiving module 110. The action information receiving module 112 receives action information indicating a direction and speed specified by an operation by an operator (participant) of a client device 100. For example, the operation may be the motion of a finger, pen, or the like on a touch panel, and from the touched positions on that touch panel, the motion of the pen or the like is detected, and a direction and speed are computed. Note that direction is a value determined by the position at which the finger or pen touched the touch panel and the position at which the finger or pen disengaged from the touch panel, while speed is a value determined by the amount of movement per unit time. To the operator of a client device 100, an operation is performed as though the operator were shooting out sticky information on the touch panel. With this operation, a "direction" is specified by the motion of the finger or pen, and a "distance" is specified by the speed.

The sticky information receiving module 114 is connected to the receiving module 110. The sticky information receiving module 114 receives sticky information entered by an operation by an operator of a client device 100. The operation may be the motion of a finger, pen, or the like on a touch panel of the client device 100, input using a keyboard or mouse, speech input using a microphone, image input using a camera, or the like. The sticky information may be text information, handwritten characters, vector data expressing a graphic or the like, speech information, still image information such as a photo, or video information, for example.

The communication module 120 is connected to the receiving module 110 and the communication module 160 of the display/placement device 150. The communication module 120 communicates with the display/placement device 150, and transmits information passed from the receiving module 110 to the display/placement device 150. In addition, the communication module 120 receives information transmitted from the display/placement device 150, which is passed to a relevant module inside the client device 100. For example, the communication module 120 may receive board screen information from the display/placement device 150 (such as the content displayed by the display control module 190), and pass the received board screen information to a display module that presents a display on a display device of the client device 100.

The communication module 160 is connected to the association decision module 170 and the communication module 120 of the client device 100. The communication module 160 receives sticky information transmitted from a client device 100.

In addition, the communication module 160 may receive sticky information transmitted from a client device 100, and action information indicating an action by an operator on that client device 100. The action information indicates a direction and speed.

The arrange command receiving module 182 is connected to the interpretation module 180. The arrange command receiving module 182 receives information specifying an area for pasting sticky information onto a board (hereinafter also called arrangement information). The arrangement information at least includes start point information indicating a start point for pasting sticky information within that area, and direction information indicating a direction in which to paste sticky information in order from that start point. Arrangement information is specified by the motion of the facilitator's finger, pen, or the like on the shared screen (hereinafter also called an arrange command), for example. An arrange command refers to an operation indicating an area and an order in which to automatically place multiple sets of sticky information. The arrangement information herein includes start point information and direction information. This arrangement information corresponds to the start point 602a and the direction 604a in the example in FIG. 6A discussed later, for example.

In addition, the arrange command receiving module 182 may also receive wrapping point information indicating a wrapping point of an area and second direction information from that wrapping point. The arrangement information in this case becomes start point information, direction information, wrapping point information, and second direction information. For example, this arrangement information corresponds to the start point 602*c*, the direction 604*c*, the wrapping point 606*c*, and the direction 608*c* in the example in FIG. 6C discussed later, for example. The wrapping point of an area refers to the point at which the direction changes when drawing lines from the start point of that area towards the direction indicated by the direction information. A change of direction refers to the direction changing by at least a predetermined angle. The predetermined angle may be 70 degrees, for example. The change of direction refers to the direction in which the facilitator's finger, pen, or the like moved from that wrapping point.

The place command receiving module 184 is connected to the interpretation module 180. The place command receiving module 184 receives information related to the movement of sticky information being displayed on the shared screen (hereinafter also called placement information). Placement information is specified by a command that moves sticky information which is performed by the motion of the facilitator's finger, pen, or the like on the shared screen (hereinafter also called a place command), for example.

The interpretation module 180 is connected to the arrangement information list storage module 172, the sticky information list storage module 174, the arrange command receiving module 182, and the place command receiving module 184. Arrangement information from the arrange command receiving module 182 is received and stored in the arrangement information list storage module 172, while placement information is received from the place command receiving module 184 and reflected in the arrangement information list storage module 172 and the sticky information list storage module 174.

The interpretation module 180, in order to decide whether a command is an arrange command or a place command, may make a decision according to whether or not sticky information exists at the position that was first touched. For example, the interpretation module 180 may decide that a command is a place command in the case in which sticky information does exist at the position that was first touched, and decide that a command is an arrange command in the case in which sticky information does not exist at the position that was first touched (the case in which a background part of the board was touched). Also, either an arrange command mode or a place command mode may be specified, and after the specification, the interpretation module 180 may decide whether a command is an arrange command or a place command.

The association decision module 170 is connected to the communication module 160, the arrangement information list storage module 172, the sticky information list storage module 174, and the display control module 190. The association decision module 170 associates sticky information pasted onto the board, on the basis of start point information and direction information received by the arrange command receiving module 182. Herein, "associates sticky information" refers to generating a group whose elements are the multiple sets of sticky information. A sticky information group included within an area formed by start point information and direction information is treated as one group.

In addition, the association decision module 170 may also associate sticky information received by the communication module 160 with any already associated sticky information.

In addition, the association decision module 170 may also associate sticky information received by the communication module 160 with any already associated sticky information, on the basis of action information received together with that sticky information. In this case, the action information may be compared to arrangement information, and the closest arrangement information may be selected.

Also, the association decision module 170 may also associate sticky information within an area determined on the basis of wrapping point information and second direction information.

In addition, the association decision module 170 may also compare a speed in action information received by the communication module 160 to a predetermined value, and differentiate the types of directions between the case of determining a low speed and the case of determining a high speed. "Differentiating the types of directions" refers to four directions (the up, down, left, and right directions) in the case of determining a low speed, and eight directions (the up, down, left, and right directions as well as the diagonal directions therebetween) in the case of determining a high speed, for example. Also, the case of determining that the speed is less than or equal to a predetermined speed may be treated as low speed, whereas the case of determining that the speed is greater than the predetermined speed may be treated as high speed, for example.

Also, the association decision module 170 may associate sticky information that has not yet been associated on the basis of either direction information in an area of already associated sticky information (direction information indicating a direction in which to paste sticky information in order from a start point) or second direction information (direction information indicating a direction in which to paste sticky information in order after starting a new line from a wrapping point). Direction information is adopted in the case in which there is no second direction information, while second direction information is adopted in the case in which there is second direction information. Also, "associating on the basis of direction information" refers to expanding an area in that direction, for example. The distance by which to expand may be a predetermined distance, or a distance that is proportional or inversely proportional to the number of sets of associated sticky information within that area (the number of sets of sticky information included in a group). In the case of setting a distance that is proportional to the number of sets of sticky information, groups having more sticky information tend to become larger, whereas in the case of setting a distance that is inversely proportional to the number of sets of sticky information, groups with less sticky information tend to become larger. The question of which method to use may be predetermined, or set according to a specifying operation by the facilitator.

The arrangement information list storage module 172 is connected to the association decision module 170 and the interpretation module 180. The arrangement information list storage module 172 stores a list of arrangement information, such as an arrangement information list 700, for example. FIG. 7 is an explanatory diagram illustrating an exemplary data structure of the arrangement information list 700. The arrangement information list 700 includes an arrangement information ID field 710, a start point coordinates field 720, a direction field 730, a wrapping point coordinates field 740, a direction field 750, a pattern field 780, a group ID field 790, and the like. The arrangement information ID field 710 stores an identification (ID) for uniquely identifying arrangement information in the exemplary embodiment. The start point coordinates field 720 stores the coordinates (x, y) of a start point on the board. The direction field 730 stores a direction (such as an angle) from a start point. The wrapping point coordinates field 740 stores the coordinates (x, y) of a wrapping point on the board. The direction field 750 stores a direction (such as an angle) from a wrapping point. The combination of the wrapping point coordinates field 740 and the direction field 750 may also not exist, or exist multiply. The pattern field 780 stores the shape of an area indicated by arrangement information. The group ID field 790 stores a group ID indicating a sticky information group included in that area.

The patterns may be the following, for example.

(1) A pattern specifying an area with a start point and a direction (see FIGS. 6A and 6B), in which the shape of the area is like a ray. Consequently, in the case in which new sticky information is added, the new sticky information is placed as an extension of the ray.

(2) A pattern specifying an area with a start point, a direction from the start point, a wrapping point, and a direction from that wrapping point (see FIGS. 6C and 6D), in which the shape of the area is like a square. Consequently, in the case in which new sticky information is added, the new sticky information is placed so as to expand the area in the directions of the direction field 730 and the direction field 750.

(3) A pattern specifying an area with a start point and a direction (see FIGS. 6E and 6F), in which the shape of the area is like an ellipse (including a circle). However, the direction in this case is made up of information that indicates clockwise or counter-clockwise turning, the major axis length of the ellipse, the minor axis length of the ellipse, the tilt of the major axis or minor axis, and outward or inward extension. Outward extension refers to the end point being positioned farther outward than the start point. As illustrated by the example in FIG. 6E, after placing one circumference worth of sticky information on the ellipse, sticky information is placed farther outward, and the area expands due to the placement of sticky information. Inward extension refers to the end point being positioned farther inward than the start point. As illustrated by the example in FIG. 6F, the size of the area is fixed, and after placing one circumference worth of sticky information on the ellipse, sticky information is placed farther inward.

The sticky information list storage module 174 is connected to the association decision module 170 and the interpretation module 180. The sticky information list storage module 174 stores a sticky information table 800 and a board information table 900, for example.

FIG. 8 is an explanatory diagram illustrating an exemplary data structure of the sticky information table 800. The sticky information table 800 includes a sticky ID field 810, a sticky content field 820, a creator ID field 830, a creation time field 840, a creation device ID field 850, a transmission time field 860, a specified sticky ID field 870, a comment field 880, and a coordinates field 890. The sticky ID field 810 stores a sticky ID for uniquely specifying sticky information in the exemplary embodiment. The sticky content field 820 stores text, graphics, an image, speech, or the like stated by a participant in the sticky information. For example, the sticky content may be a character code sequence, vector data indicating the path of a finger or pen, or the file name of a file storing such data. The creator ID field 830 stores a participant ID for uniquely specifying the participant who created that sticky information in the exemplary embodiment. The creation time field 840 stores the time at which that sticky information was created (the time may be the year, month, day, hour, minute, second, fraction of a second, or some combination thereof. This applies similarly hereinafter.) The creation device ID field 850 stores a creation device ID for uniquely specifying the client device on which that sticky information was created in the exemplary embodiment. The transmission time field 860 stores the time at which that sticky information was transmitted. The specified sticky ID field 870 stores second sticky information related to that sticky information (the first sticky information). The "second sticky information" is sticky information that is already pasted onto the board. The information may be the sticky ID of second sticky information specified by the participant who created by the first sticky information, and the sticky ID of that second sticky information is specified in the case where, for example, the content of the first sticky information was proposed by looking at the second sticky information, and the participant thinks that the content should be placed near the second sticky information. Also, instead of the sticky ID of second sticky information, the information may be an arrangement information ID or a group ID. Note that "NULL" is stored in the case in which a participant does not specify second sticky information. Also, in the case in which the specified sticky ID field 870 is "NULL", an action information table 1200 may be attached. The comment field 880 stores a comment related to that sticky information. The creator of the comment may be the participant who created the sticky information, another participant, or the facilitator. The coordinates field 890 stores the coordinates (x, y) at which that sticky information is placed. When a sticky is directly pasted onto the board, the coordinates may be the coordinates (x, y) of the board. When a sticky belongs to a group, the coordinates may be relative coordinates (x, y) from the start point of the group.

FIG. 9 is an explanatory diagram illustrating an exemplary data structure of the board information table 900. The board information table 900 includes a board ID field 905, a board background field 910, a participant ID field 915, a facilitator ID field 920, a creation time field 925, an end time field 930, a number of groups field 935, a group ID field 940, a group name field 945, a group position field 950, a sticky ID in group field 955, a number of stickies field 960, a sticky ID field 965, a sticky position field 970, and a number of likes field 975. The board ID field 905 stores a board ID for uniquely specifying a board in the exemplary embodiment. The board background field 910 stores a background pattern for the board (such as XY axes or a template image, for example). The participant ID field 915 stores participant IDs of participants using that board. The facilitator ID field 920 stores a facilitator ID of a facilitator using that board. The creation time field 925 stores the creation start time of that board. The end time field 930 stores the creation end time of that board. The number of groups field 935 stores the number of groups forming sets on that board. There exist sets of the group ID field 940, the group name field 945, the group position field 950, and the sticky ID in group field 955, equal to the number of groups. The group ID field 940 stores a group ID for uniquely specifying that group in the exemplary embodiment (the same as the group ID field 790 of the arrangement information list 700). The group name field 945 stores a name for that group (such as group A and group B in FIG. 4 and other drawings). The group position field 950 stores the position of that group on the board (XY coordinates on the board, for example). The sticky ID in group field 955 stores sticky IDs of sticky information included as elements in that group. The number of stickies field 960 stores the number of sets of sticky information pasted on that board. There exist sets of the sticky ID field 965, the sticky position field 970, and the number of likes field 975, equal to the number of sets of sticky information. The sticky ID field 965 stores a sticky ID of sticky information pasted onto that board. The sticky position field 970 stores the position of that sticky information on the board (which may XY coordinates on the board, or relative coordinates from the start point of the group to which that sticky information belongs, for example). The number of likes field 975 stores a count of the number of times participants pressed a "Like" button for that sticky information (that is, the number of likes).

Note that the above group indicates a sticky information group associated by an area specifying operation by the facilitator, but a default group (such as group Z, for example) may also be set. The default group refers to one that includes, as elements, sticky information pasted onto the board before association is conducted. Consequently, sticky information that was not associated by an area specifying operation by the facilitator is included in the default group. In the case of setting such a default group, the coordinates field 890 of the sticky information table 800 illustrated by the example in FIG. 8 discussed above may be omitted. In other words, the position of unassociated sticky information may also be indicated by the sticky position field 970 of the board information table 900.

The display control module 190 is connected to the association decision module 170. The display control module 190 displays a sticky information group associated by the association decision module 170 so as to indicate the association on the board. Herein, "displaying so as to indicate the association" refers to, for example, displaying lines enclosing an associated sticky information group, applying the same color to an associated sticky information group (obviously, other associated sticky information groups have different colors), or the like. Furthermore, a group name or the like may be displayed near that associated sticky information group. Also, in this case, the position of associated sticky information may be modified in accordance with arrangement information.

Also, the display control module 190, on the basis of direction information in a sticky information group associated by the association decision module 170, may display sticky information received by the communication module 160 on the board at the next position after the last sticky information in that sticky information group.

In addition, the display control module 190 may decide on a position on the board for displaying sticky information received by the communication module 160, and display the sticky information at that position, on the basis of action information received together with that sticky information.

Note that the display/placement device 150 may be, from among the modules discussed earlier, a combination of the place command receiving module 184, the association decision module 170, and the display control module 190, or a combination of the communication module 160 and the display control module 190.

Figure 2:
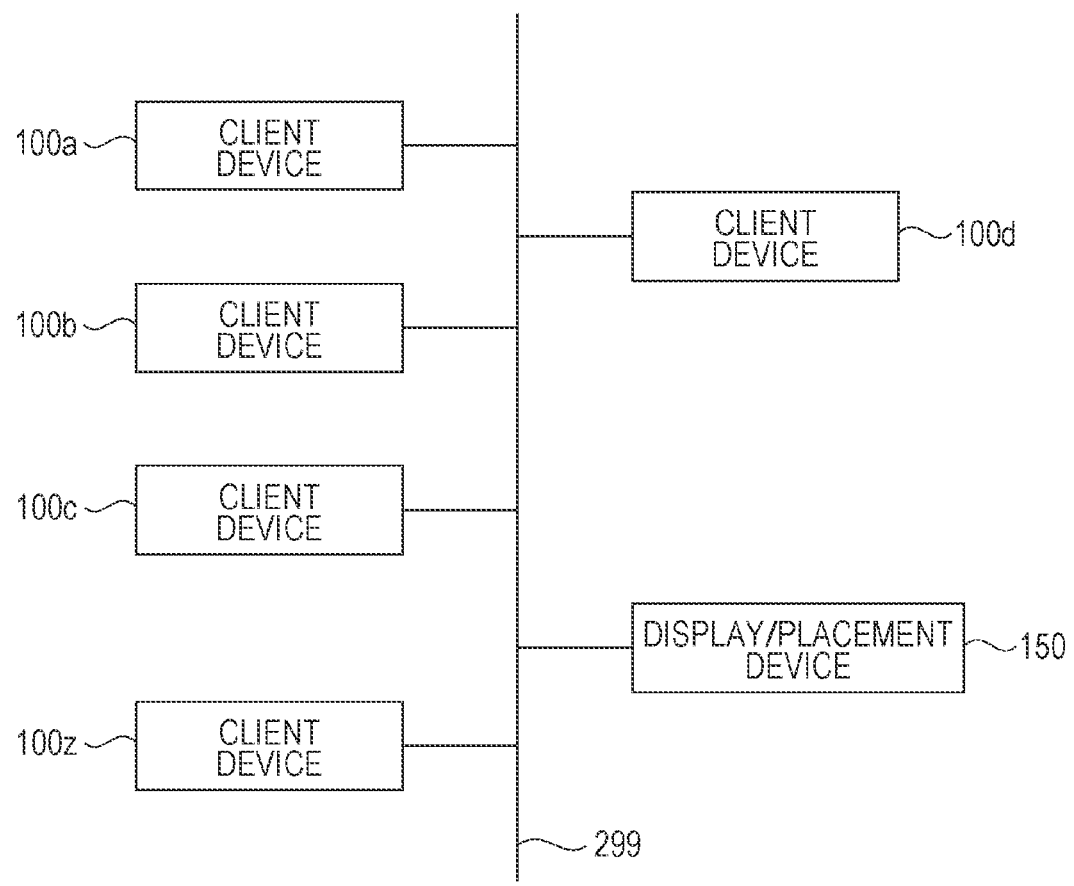
FIG. 2 is an explanatory diagram illustrating an exemplary system configuration in the case of realizing the exemplary embodiment.

FIG. 2 is an explanatory diagram illustrating an exemplary system configuration in the case of realizing the exemplary embodiment. Devices such as a client device 100a, a client device 100b, a client device 100c, a client device 100d, a client device 100z, and the display/placement device 150 are respectively connected via a communication link 299. Although not all devices may be in the same room (such as a conference room), generally the client device 100a and the like used by participants and the display/placement device 150 used by the facilitator are in the same room. The communication link 299 may be a wired link or a wireless link.

FIG. 3 is an explanatory diagram illustrating an example of a conference room or the like used by the exemplary embodiment.

Figure 3A:
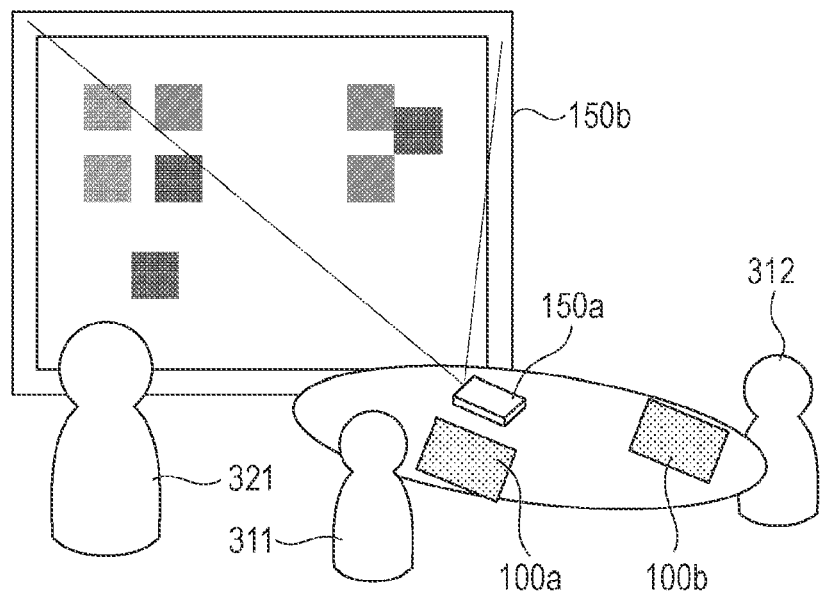
FIGS. 3A and 3B are explanatory diagrams illustrating an example of a conference room or the like used by the exemplary embodiment.
Figure 3B:
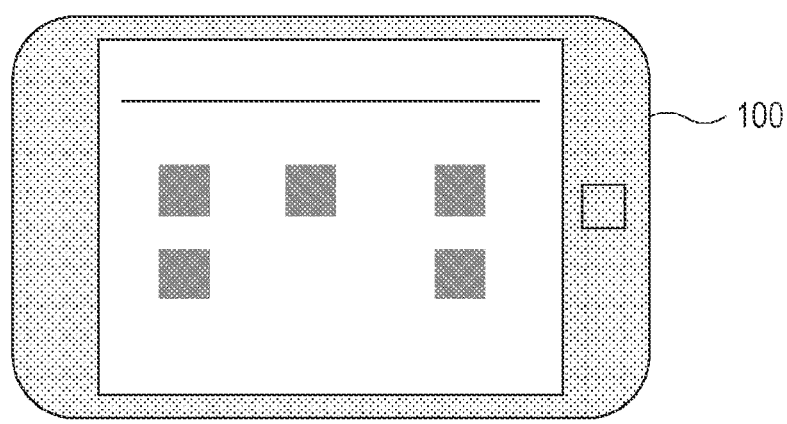

As illustrated in the example in FIG. 3A, participants 311 and 312 and a facilitator 321 are gathered in a conference room or the like. The participant 311 uses the client device 100a, while the participant 312 uses the client device 100b. Generally, each participant is given one client device (such as the client device 100a) which, like the client device 100 illustrated in the example of FIG. 3B, is a tablet device approximately the size of a notebook (such as A4, B5, or from 7 to 10 inches, for example), and is operated using a finger, pen, or the like. Sticky information stating handwritten text, graphics, or the like is created by a participant. Note that a client device is not limited to a tablet device, and may also be a device such as a PC equipped with a keyboard, mouse, and the like.

The display/placement device 150a is a projector, and displays a board. The display/placement device 150a may also be a device equipped with a large screen (a size such as 80 inches, for example). In addition, the display/placement device 150b is an electronic whiteboard that senses the motion of a finger, pen, or the like of a facilitator 321, and receives operations such as the associating (grouping) of sticky information. For example, the display/placement device 150b may be equipped with a pen, and receives an operation with respect to the board and sticky information by sensing that the pen has left a predetermined pen holder (that is, the facilitator 321 has picked up the pen in order to perform an operation), and by sensing the position of the pen tip (such as the pen tip touching the display/placement device 150b). For example, a sensor may be provided in the pen holder (such as a sensor in which a switch turns on/off by the weight of a pen), and may sense which pen from among multiple pens (such as a black pen, a red pen, and a blue pen) is being used. Also, the entire display screen of the display/placement device 150b may be a touch sensor, and may sense touched positions on the display screen.

Figure 4:
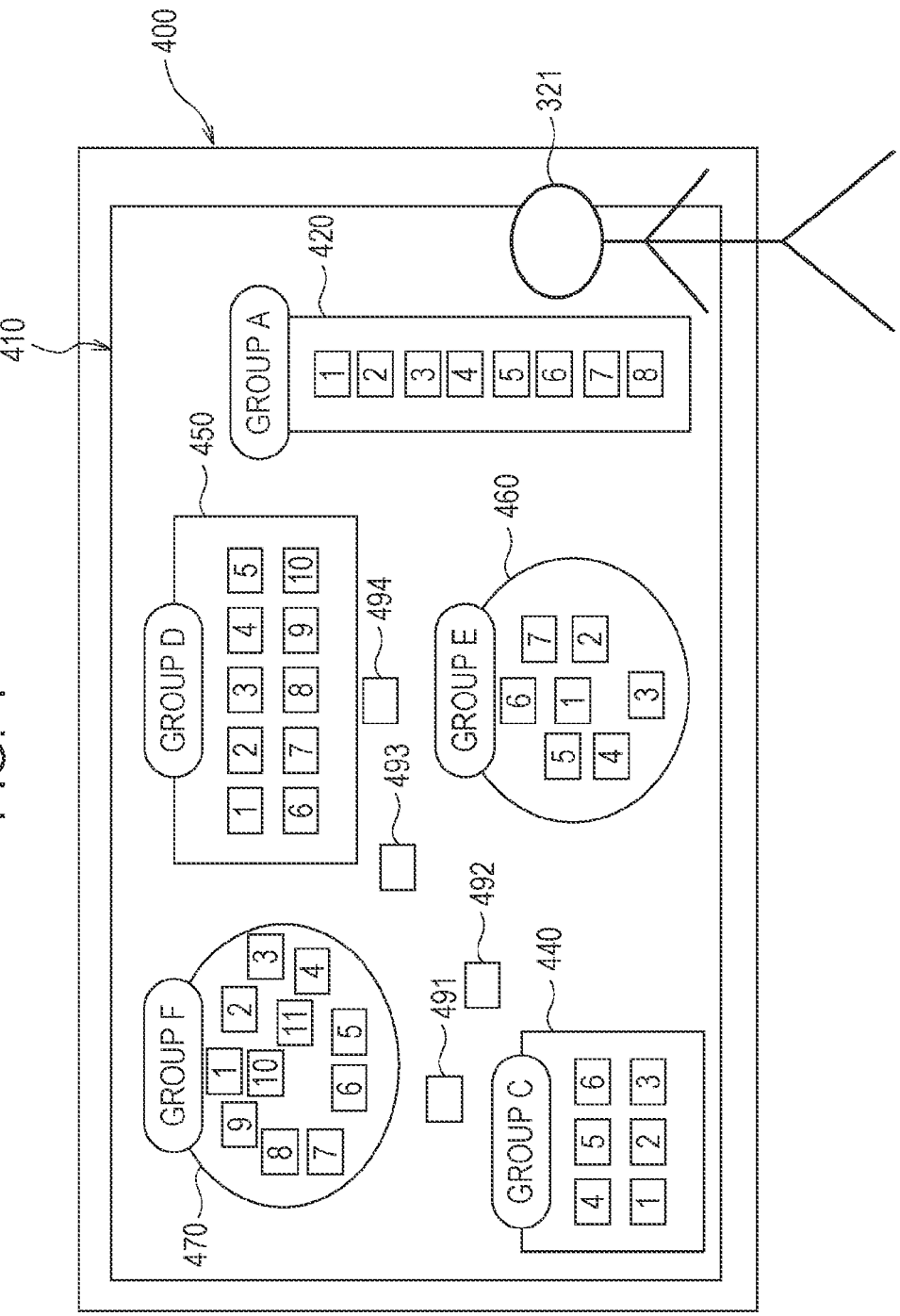
FIG. 4 is an explanatory diagram illustrating an exemplary display of a shared screen according to the exemplary embodiment.

FIG. 4 is an explanatory diagram illustrating an exemplary display of a shared screen 400 according to the exemplary embodiment. The shared screen 400 is displayed on the display/placement device 150b illustrated in the example of FIG. 3A.

The shared screen 400 includes a board area 410. Inside the board area 410, besides general sticky information (the small rectangles in FIG. 4), there are displayed a group area A 420, a group area C 440, a group area D 450, a group area E 460, and a group area F 470 in which the sticky information is associated. Additionally, sticky information is moved inside the board area 410 according to an operation by the facilitator 321 (such as moving to another group, for example). Also, sticky information whose position has been specified by the participant of a client device (an operation specifying action information for associating the above sticky information with a group) is placed inside a group inside the board area 410. For example, sticky information that is related to the group A is placed at a position after the sticky (8) (the bottom of FIG. 4).

Also, multiple sets of sticky information may be grouped (like the group area C 440 and the group area D 450, for example) by an operation of the facilitator 321. An operation of the arrangement information discussed earlier (for example, an operation such as placing related sticky information in one place and drawing an enclosing line around the sticky information) may be sensed, and the enclosed sticky information may be grouped. An operation of arrangement information will be discussed later using FIGS. 6A to 6E.

Also, participants are able to "Like" sticky information pasted onto the board. For example, in the case in which a participant approves of the content stated in sticky information, the participant specifies that sticky information and presses a "Like" button displayed on the client device 100 (or presses a "Like" button attached to each set of sticky information). The number of presses is then counted and stored in the number of likes field 975 of the board information table 900. Sticky information for which the number of presses is greater than a predetermined number may be displayed larger than other sticky information.

Obviously, sticky information that has not yet been associated may also exist. For example, in FIG. 4, there are four sets of sticky information (the sticky information 491 to 494) that do not belong to any group. The association decision module 170 may associate these sets of sticky information with an existing group on the basis of a direction from the start point or a direction from the wrapping point in an existing group. For example, if the group area D 450 were expanded in the direction from the wrapping point (downward in FIG. 4), the sticky information 494 would be included, and thus the sticky information 494 may be associated with the group D. Additionally, in the display, the sticky information 494 may be repositioned as the 11th arranged sticky information inside the group area D 450.

The display/placement device 150 of the present exemplary embodiment is introduced into such a conference support system.

FIG. 5 is a flowchart illustrating an exemplary process according to the exemplary embodiment.

In step S502, the arrange command receiving module 182 receives an arrange command from the facilitator.

In step S504, the interpretation module 180 interprets the arrange command, and generates arrangement information. FIGS. 6A to 6E are explanatory diagrams illustrating examples of arrangement information according to the exemplary embodiment. The small rectangles are sets of sticky information being displayed. Arrangement information at least includes start point information and direction information. In the example of FIG. 6A, an area 610a is formed by a start point 602a and a direction 604a. An operation specifying the start point 602a and the direction 604a corresponds to an operation that touches the position of the start point 602a, and then directly moves in the direction 604a. Also, sticky information near the track left by the operation is associated. Herein, "near" refers to being within a predetermined distance from the coordinates of the track. Obviously, the track may be drawn above the sticky information like in the example of FIG. 6A, or drawn below. Additionally, the lineup of sticky information may be as illustrated by the example of FIG. 6A along the direction 604a. In addition, the positions of associated sticky information may be arranged. Sticky information is lined up along the direction 604a, with a predetermined distance as the interval between each set of sticky information. In the case of adding new sticky information to the group, the new sticky information is placed to the right of the sticky information (7) along the direction 604a. Consequently, in this case, the sticky information is lined up in a single line. FIG. 6B illustrates a similar example, in which the direction 604b is diagonally downward to the right. Obviously, the direction information may also be upward, leftward, or the like.

Figure 6C:
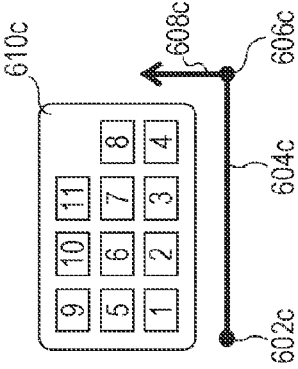
FIGS. 6A to 6F are explanatory diagrams illustrating examples of arrangement information according to the exemplary embodiment.
Figure 6F:
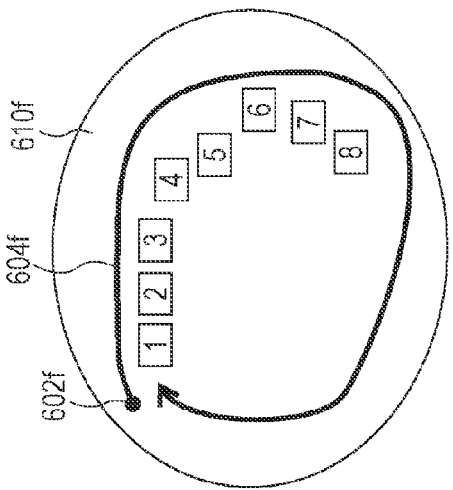
Figure 6B:
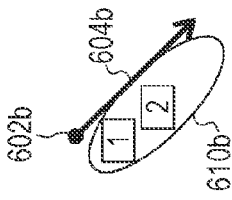

In the example of FIG. 6C, an area 610c is formed by a start point 602c, a direction 604c, a wrapping point 606c, and a direction 608c. The start point 602c and the direction 604c are the same as the above start point 602a and the direction 604a. A direction change in which there is a temporary stop along the track of the direction 604c and the directions before and after are equal to or greater than a predetermined angle (equal to or greater than 70 degrees, for example) may be sensed. Also, a simple direction change may also be sensed. Additionally, sticky information near the track left by the operation is associated. Sticky information is lined up from left to right as illustrated by the example of FIG. 6C along the direction 604c. After lining up to the position of the wrapping point 606c, the row shifts upward in the direction 608c, as illustrated by the example of FIG. 6C. In the case of adding new sticky information to the group, the new sticky information is placed to the right of the sticky information (11) along the direction 604c or the direction 608c. Consequently, in this case, the group becomes a square area in which four sets of sticky information are lined up in the horizontal direction. In other words, there is formed a rectangle, with one edge going from the start point to the wrapping point, that grows in the direction at a right angle to the edge. FIG. 6D illustrates a similar example, in which the direction 608d is downward. Obviously, as long as the first direction information and the second direction information differ, any combination of directions is possible.

Figure 6E:
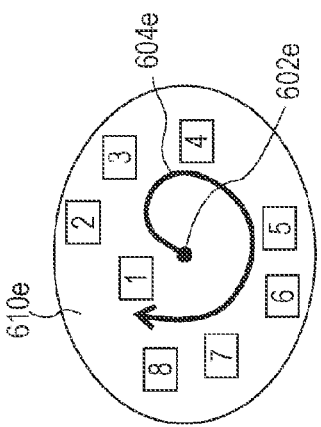
Figure 6A:
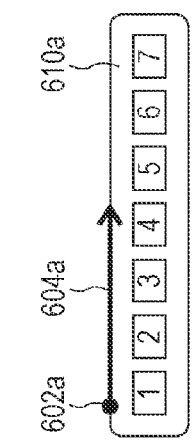
Figure 6D:
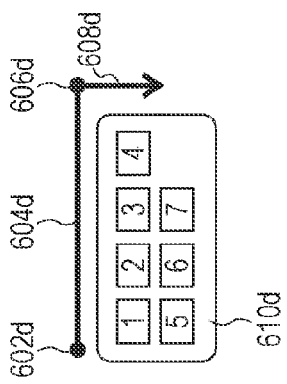

In the example of FIG. 6E, an area 610e is formed by a start point 602e and a direction 604e. In the example of FIG. 6F, an area 610f is formed by a start point 602f and a direction 604f. In the case in which the track of the direction 604e or the direction 604f is recognized to be an ellipse, it is sensed whether or not the end point of the direction (the direction 604e or the direction 604f) is farther outward on the ellipse compared to the start point (the start point 602e or the start point 602f). In the case of sensing that the end point is farther outward as illustrated by the example of FIG. 6E, an area 610e is formed in which the ellipse grows outward. For the lining up of sticky information, sticky information is placed along the direction 604e, and after one circumference, is placed farther outward. Conversely, in the case of sensing that the end point is farther inward as illustrated by the example of FIG. 6F, an area 610f is formed in which the size of the elliptical shape is fixed. For the lining up of sticky information, sticky information is placed along the direction 604f, and after one circumference, is placed farther inward.

These sensed results are stored in the arrangement information list 700.

In step S506, the interpretation module 180 stores arrangement information (an arrangement information list 700) in the arrangement information list storage module 172.

In step S508, the association decision module 170 extracts sticky information included inside an area indicated by the generated arrangement information from the sticky information list storage module 174 (the board information table 900). As discussed earlier, sticky information near the coordinates of a track may be extracted.

In step S510, the association decision module 170 associates the extracted sticky information. Specifically, the same group ID is given to the extracted sticky information.

In step S512, the display control module 190 presents a display demonstrating that the multiple associated sticky information is a single sticky information group. For example, a line enclosing the sticky information belonging to the same group may be drawn as illustrated by example in FIG. 4. Also, sticky information belonging to the same group may be given the same color.

FIG. 10 is a flowchart illustrating an exemplary process according to the exemplary embodiment. The processing from step S1002 to step S1006 is a process on the client device 100, while the processing after step S1008 is a process on the display/placement device 150.

In step S1002, the sticky information receiving module 114 receives sticky information according to an operation by an operator (participant). Text data, handwriting vector data, or the like is stated as sticky information.

In step S1004, the action information receiving module 112 receives action information according to an operation by an operator. For example, sticky information pasted onto a board is selected on a touch panel of the receiving module 110. Next, the "shoot" operation discussed earlier is performed on that sticky information. Because of this "shoot" operation, a direction and speed are specified. FIG. 12 is an explanatory diagram illustrating an exemplary data structure of an action information table 1200. The action information table 1200 includes an action information ID field 1210, a start point coordinates field 1220, a direction field 1230, a speed field 1240, and a sticky ID field 1250. The action information ID field 1210 stores an ID for uniquely identifying action information in the exemplary embodiment. The start point coordinates field 1220 stores the coordinates first touched in a "shoot" operation. The direction field 1230 stores a direction (angle). The speed field 1240 stores a speed. The sticky ID field 1250 stores the sticky ID of the sticky information being processed.

In step S1006, the communication module 120 transmits sticky information and action information to the display/placement device 150.

In step S1008, the communication module 160 receives sticky information and action information from a client device 100.

In step S1010, the arrangement information list storage module 172 uses the action information to compute a score indicating the degree to which to associate the sticky information to an information group (group) associated by the arrangement information. FIG. 11 is an explanatory diagram illustrating an example of action information according to the exemplary embodiment. FIG. 11 assumes a board that is being displayed on a shared screen (in the example of FIG. 4, the board area 410). The center illustrated in the example of FIG. 11 matches the center of the board. In the case of determining that the speed of the action information is low speed, there is extracted a group that is positioned in an area that matches the direction of the action information from among areas divided into four types (a low speed upward direction specification area 1112, a low speed rightward direction specification area 1114, a low speed downward direction specification area 1116, and a low speed rightward direction specification area 1118), in a range within a low speed direction specification area 1110. In the case of determining that the speed of the action information is high speed, there is extracted a group that is positioned in an area that matches the direction of the action information from among areas divided into eight types (a high speed upward direction specification area 1152, a high speed up-rightward direction specification area 1154, a high speed rightward direction specification area 1156, a high speed down-rightward direction specification area 1158, a high speed downward direction specification area 1160, a high speed down-leftward direction specification area 1162, a high speed leftward direction specification area 1164, and a high speed up-leftward direction specification area 1166), in a range within a high speed direction specification area 1150. Subsequently, that group is scored. For example, in the case in which there is one extracted group, the sticky information may be associated with that group (in this case, the processing in step S1012 is also conducted). In the case of multiple extracted groups, the surface area overlapping a group within the four areas or the eight areas is computed, and a score is computed according to that surface area (for example, the score is proportional to the surface area). Herein, assume that a higher score means that a group is more suitable for association.

In step S1012, the arrangement information list storage module 172 selects the arrangement information (group) having the most suitable score. Herein, the group with the highest score is selected.

In step S1014, the arrangement information list storage module 172 adds the sticky information to the arrangement information (group). Specifically, the selected group ID is given to the sticky information.

In step S1016, the display control module 190 updates the display related to the arrangement information (group) with the added sticky information. As discussed earlier, the sticky information is placed within that group according to the arrangement information.

Figure 13:
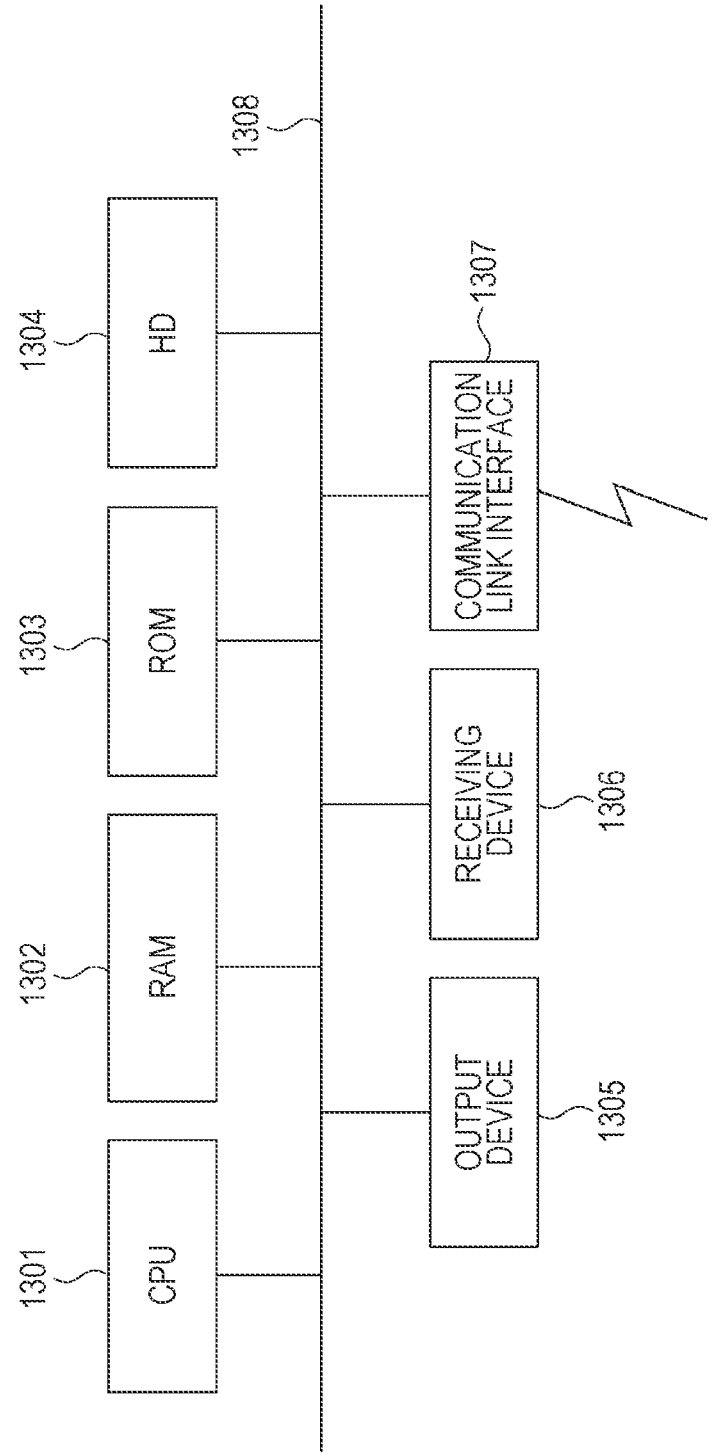
FIG. 13 is a block diagram illustrating an exemplary hardware configuration of a computer that realizes an exemplary embodiment.

Note that a hardware configuration of a computer executing a program that acts as the present exemplary embodiment (such as the client device 100 or the display/placement device 150) is a general computer as illustrated by the example of FIG. 13, and specifically is a computer or the like that may be a personal computer or a server. In other words, as a specific example, a CPU 1301 is used as a processing unit (computational unit), while RAM 1302, ROM 1303, and an HD 1304 are used as storage devices. For the HD 1304, a hard disk may be used, for example. The computer is made up of the CPU 1301 that executes programs such as the receiving module 110, the action information receiving module 112, the sticky information receiving module 114, the communication module 120, the communication module 160, the association decision module 170, the interpretation module 180, the arrange command receiving module 182, the place command receiving module 184, and the display control module 190, the RAM 1302 that stores such programs and data, the ROM 1303 that stores programs and the like for activating the computer, the HD 1304 which is an auxiliary storage device, a receiving device 1306 that receives data on the basis of user operations with respect to a keyboard, mouse, touch panel, or the like, an image output device 1305 such as a CRT or liquid crystal display, a communication link interface 1307 such as a network interface card for connecting to a communication network, and a bus 1308 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiments are realized by the cooperative action of the software and hardware resources.

Note that the hardware configuration illustrated in FIG. 13 illustrates a single exemplary configuration, and that the exemplary embodiment is not limited to the configuration illustrated in FIG. 13 insofar as the configuration still enables execution of the modules described in the exemplary embodiment. For example, some modules may also be realized with special-purpose hardware (such as an ASIC, for example), and some modules may be configured to reside within an external system and be connected via a communication link. Furthermore, it may also be configured such that multiple instances of the system illustrated in FIG. 13 are connected to each other by a communication link and operate in conjunction with each other. Additionally, besides a personal computer in particular, an exemplary embodiment may also be incorporated into a device such as an information appliance, photocopier, fax machine, scanner, printer, or multi-function device (i.e., an image processing device having two or more from among scanning, printing, copying, and faxing functions).

Note that in the foregoing description of the exemplary embodiment, that which is taken to be "equal to or greater than", "less than or equal to", "greater than", or "less than" in a comparison with a predetermined value may also be taken to be "greater than", "less than", "equal to or greater than", or "less than or equal to", respectively, insofar as the combination does not produce a contradiction.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a first receiving unit that receives information specifying an area for pasting sticky information onto a board, the information being at least start point information indicating a start point for pasting sticky information within that area, and direction information indicating a direction in which to paste sticky information in order from that start point;
an associating unit that associates sticky information pasted onto the board, on the basis of start point information and direction information received by the first receiving unit; and
a display that displays a sticky information group associated by the associating unit so as to indicate the association on the board.

2. The information processing device according to claim 1, further comprising:
a second receiving unit that receives sticky information transmitted from a client device;
wherein the associating unit associates sticky information received by the second receiving unit with any already associated sticky information, and
the display, on the basis of the direction information in a sticky information group associated by the associating unit, displays sticky information received by the second receiving unit on the board at a next position after last sticky information in that sticky information group.

3. The information processing device according to claim 2, wherein
the second receiving unit receives action information indicating a direction and a speed, the action information being information indicating an action by an operator on the client device, and
the associating unit associates sticky information received by the second receiving unit with any already associated sticky information, on the basis of the action information received together with that sticky information.

4. The information processing device according to claim 1, wherein
the first receiving unit receives wrapping point information indicating a wrapping point of the area, and second direction information from that wrapping point, and
the associating unit associates sticky information within an area determined on the basis of the wrapping point information and the second direction information.

5. The information processing device according to claim 1, wherein
the associating unit associates unassociated sticky information on the basis of either the direction information or the second direction information in an area of already associated sticky information.

6. An information processing device comprising:
a receiving unit that receives sticky information and action information indicating a direction and a speed transmitted from a client device, the action information being information indicating an action by an operator on that client device; and
a display that decides on a position on a board and displays sticky information received by the receiving unit, on the basis of the action information received together with that sticky information.

7. The information processing device according to claim 6, wherein
the associating unit compares a speed within action information received by the second receiving unit to a predetermined value, and differentiates a type of the direction between the case of determining a low speed and the case of determining a high speed.

8. An information processing method comprising:
receiving information specifying an area for pasting sticky information onto a board, the information being at least start point information indicating a start point for pasting sticky information within that area, and direction information indicating a direction in which to paste sticky information in order from that start point;
associating sticky information pasted onto the board, on the basis of received start point information and direction information; and displaying an associated sticky information group so as to indicate the association on the board.

9. A non-transitory computer readable medium storing a program causing a computer to execute a process for processing information, the process comprising:
- receiving information specifying an area for pasting sticky information onto a board, the information being at least start point information indicating a start point for pasting sticky information within that area, and direction information indicating a direction in which to paste sticky information in order from that start point;
- associating sticky information pasted onto the board, on the basis of received start point information and direction information; and
- displaying an associated sticky information group so as to indicate the association on the board.

10. A non-transitory computer readable medium storing a program causing a computer to execute a process for processing information, the process comprising:
- receiving sticky information and action information indicating a direction and a speed transmitted from a client device, the action information being information indicating an action by an operator on that client device; and
- deciding on a position on a board and displaying received sticky information, on the basis of the action information received together with that sticky information.

* * * * *